US005111568A

United States Patent [19]

Telama

[11] Patent Number: 5,111,568

[45] Date of Patent: May 12, 1992

[54] PAPER MACHINE ROLL

[75] Inventor: Ari Telama, Jyvaskylä, Finland

[73] Assignee: Valmet Paper Machinery Inc., Finland

[21] Appl. No.: 736,597

[22] Filed: Jul. 26, 1991

Related U.S. Application Data

[62] Division of Ser. No. 569,070, Aug. 17, 1990, Pat. No. 5,056,220.

[30] Foreign Application Priority Data

Aug. 24, 1989 [FI] Finland ................................ 893970

[51] Int. Cl.[5] ........................ B21B 31/08; B60B 5/00; B60B 21/00

[52] U.S. Cl. .................................... 29/132; 29/895.32

[58] Field of Search ...................... 29/805.32, 132, 130; 204/49, 51, 52.1, 55.1

[56] References Cited

U.S. PATENT DOCUMENTS 23,633 4/1859 Wilcox ........................ 29/895.32 X
3,607,678 9/1971 Wise .............................. 204/52.1 X
3,929,596 12/1975 Sasame et al. ......................... 204/49
4,374,721 2/1983 Hara et al. ........................ 29/132 X
4,704,776 11/1987 Watanabe et al. .................... 29/132
4,748,736 6/1988 Miihkinen ........................ 29/132 X
4,856,161 8/1989 Miihkinen ........................ 29/132 X
4,977,830 12/1990 Fadner ............................ 29/132 X
5,056,220 10/1991 Telama ............................ 29/132 X

*Primary Examiner*—Timothy V. Eley
*Assistant Examiner*—C. Richard Martin
*Attorney, Agent, or Firm*—Steinberg & Raskin

[57] ABSTRACT

A roll for use in paper making has a surface comprising a porous material in which the press have been sealed by an electrolyte to achieve optimal paper web dewatering capacity, lessen adherence of a paper web to the roll surface, and to improve the corrosion resistance and mechanical strength of the roll coating. A method for making the roll by electrochemical deposition of the electrolyte in the pores of the roll surface is also disclosed.

5 Claims, 3 Drawing Sheets

PAPER MACHINE ROLL

This is a division of application Ser. No. 07/569,070 filed Aug. 17, 1990 now U.S. Pat. No. 5,056,220.

BACKGROUND OF THE INVENTION

The present invention is related to a roll used in paper or paperboard making, on the cylinder shell of which roll is formed a porous coating, and a method for making the roll.

The roll according to the invention can be used for example as a center roll of a press section or as a calender roll, with which a paper web is in direct contact and from which the web is loosened, or for example as a grooved roll or a suction roll (or a wire leading roll, felt leading roll, spreader roll), which is in direct contact with fabrics used on paper machines, such as felts and wires, or as a drying cylinder, a roll of a reeler or a carrying roll.

Coated rolls are used on paper making machines and paper finishing machines in many diverse applications. Such applications include for example press rolls, suction rolls, soft rolls of calenders or supercalenders and the like. Different quality requirements are set for the coating of a roll in different applications and different processes. Different quality factors of a coating include e.g. hardness at a certain temperature, temperature stability, pressing stability, chemical resistance, surface smoothness, resistance to mechanical damage, elasticity, surface energy, loosening properties of paper, electroconductivity and non-aging.

A stone roll made of granite is, as known, used in the press section of a paper machine. Granite is preferred because of its surface properties, which make the paper web loosen from the stone surface in a controlled manner. Furthermore, granite has a good resistance to the wearing effect of a doctor blade. Granite has, however, certain disadvantages. Since it is a natural material, its properties vary, and the internal defects of granite as well as its tendency to crack form a serious obstacle to its use in certain applications. Granite is also a heavy material, which increases the tendency of the structures to vibrate. The weight of a stone roll is also reflected in the dimensioning of the lifting devices and foundations of the paper machine.

Synthetic stone rolls are also known, which in principle correspond to polymer coating rolls, in which stone powder, such as quartz sand, has been added among hard rubber and polyurethane. Excessive adherence of the paper web to the roll surface and poor mechanical resistance represent disadvantages of these rolls.

Finnish Pat. No. 70 723, held by the applicant, describes a press roll, whose surface layer is formed of a mixture of a metallic powder and an inorganic substance. The purpose of the metal is to act as a binder and increase the toughness of the roll coating. The purpose of the inorganic substance is to achieve a wear-resistant surface with a suitable surface energy, since the surface energy of the roll surface has to remain within certain limits to make the loosening of the paper web from the press roll surface in a controlled manner possible. Pat. application No. 853544, filed by the applicant, is also related to a similar roll, in which the metallic component is a chromium-containing stainless steel, the chromium improving the corrosion resistance of the steel.

Finnish Pat. application No. 882006 describes a roll, in which the outer surface of the roll is formed of areas rich in carbide and matrix areas located therebetween.

U.S. Pat. No. 4,704,776 describes a paper machine press roll with a metal body and a metallic basic coating formed on the metal body, whose expansion coefficient is smaller than that of the surface of the metal body, and on which metallic coating is formed a ceramic layer with a porosity of 1-30%.

In prior art rolls, it has always been difficult to achieve sufficiently good, different surface properties simultaneously, e.g. porosity has been a problem. If porosity has been too low, water retention and wettability of the roll surface have remained insufficient, because of which a wet paper web does not loosen uniformly therefrom. If porosity has in contrast been too high, the water retention is too high, which results in a degraded dewatering capacity and as a consequence thereof in too high a water content of paper, poorer strength properties and durability, and finally in an unserviceable roll.

When the purpose has been to produce a surface with a lower porosity for improving the strength properties the pores have been blocked with a plastic sealant by using a brush or by spraying.

In the aforementioned U.S. Pat. No. 4,704,776, this problem has been solved by varying the porosity of the different layers of the coating for adjusting the water retention of the roll.

SUMMARY OF THE INVENTION

An object of the invention is to improve the rolls described in Finnish Pat. application No. 882006 and Finnish application No. 853544 as well as the roll of the Finnish Publication Print No. 70 273 with regard to the loosening of the paper web therefrom, corrosion resistance and strength properties.

Another object of the invention is to reduce the problems related to the porosity of the rolls of the prior art by improving the strength properties of rolls without reducing the loosening properties of paper webs therefrom.

For achieving these objects, the inventive roll has its pores sealed electrochemically by means of a coating agent made of an electrolyte.

The inventive method for manufacturing the coating of this roll comprises the following stages:

a porous coating is first formed in a known manner, e.g. by thermal spraying, after which inside and/or on the porous coating an electrolytic coating is formed that seals the pores from the bottoms up to and over their respective rims, thus altering the surface properties of the coating and reinforcing it.

Roll bodies or central cores of rolls manufactured by means of well-known casting techniques as well as their ends and journals can be used in connection with the invention, which method enhances the mechanical strength of the roll, and wherein the surface properties of the roll and roll surface strength are achieved in a novel manner.

The porous surface of the inventive roll can be manufactured by means of several different methods, which have been described in the FI Pat. No. 70 273 and FI Patent application No. 853544. However, the porous coating of the inventive roll is preferably formed by means of thermal spraying.

The pore size of the porous coating according to the invention is preferably 5-50 microns and the volume percent of the pores 4-30% of the porous coating and the coating thickness 0.2-1.5 mm.

In accordance with the invention, a paper machine roll having a conductive or a porous, poorly conductive or non-conductive ceramic, metallic or metallic-ceramic coating is sealed electrochemically.

Electrochemical coating methods include e.g. chrome plating, nickel plating, spread coating, and electroplating as well as electrochemical coating of copper, tin, cadmium, rhodium, lead, silver, brass and bronze.

Chrome plating occurs in a coating pan in such a way that the block is submerged in an electolyte. The electrolyte is formed of water, in which 250 g/l of $CrO_3$ and 2.5 g/l of $H_2SO_4$ have been dissolved according to a preferred embodiment. The ratios of $CrO^3$ to $H_2SO_4$ vary between 100:0.9 and 100:1.3. The temperature of the electrolyte is 35°-70° C. During coating, the roll is connected as a cathode and an insoluble lead plate as an anode. The density of the current on the cathode is adjusted to approximately 40-70 $A/dm^2$. FIG. 3 illustrates the chrome plating occurrence.

Nickel plating is in principle a process similar to chrome plating. Typical electrolytes used in nickel plating and process conditions of nickel plating are listed in Table 1.

TABLE 1

| NICKEL-PLATING CONDITIONS | Watts in bath (a) | Sulphamate in bath | Fluoborate in bath |
|---|---|---|---|
| Composition, oz. per gal. | | | |
| Nickel sulphate, $NiSO_46H_2O$ | 30-55 | — | — |
| Nickel chloride, $NiCl_26H_2O$ | 4-8(a) | 0-4 | 0-2 |
| Nickel sulphamate, $Ni(SO_3NH_2)_2$ | — | 35-60 | — |
| Nickel fluoborate, $Ni(BF_4)_2$ | — | — | 30-40 |
| Total quantity of Nickel (met.) | 7.7-14.2 | 8.2-15 | 7.6-10.5 |
| Boric acid, $H_3BO_3$ | 4-6 | 4-6 | 2-4 |
| Anti-corrosive agents | (b) | (b) | (b) |
| Operating conditions | | | |
| pH | 1.5-5.2 | 3-5 | 2.5-4 |
| Temperature, °F. | 115-160 | 100-140 | 100-160 |
| Current density, amps per sq. ft. | 10-100 | 25-300 | 25-300 |
| Mechanical properties of coatings | | | |
| Tensional strength, 1000 psi | 50-100 | 55-155 | 55-120 |
| Hardness (Vickers) | 100-250 | 130-600 | 125-300 |
| Strain 2 in, % | 10-35 | 3-30 | 5-30 |
| Stress, 1000 psi | 15-30 | 0.5-16 | 13-30 |

Other electrochemical coating methods are described in "Metals Handbook", VOL. 2 (8th edition), pp. 409-489.

Spread coating is an electric coating method for locally repairing worn or corroded surfaces damaged in some other way. Several different coating alternatives can be selected for achieving properties very different from each other. Spread coating produces wear-resistant and corrosion-resistant coatings, i.e. very hard, dense, well-adhered and corrosion-resistant surfaces.

Selections can be made from among 60 different coatings. Table 2 shows different available coating materials. The most common coatings are nickel and copper coatings.

This inventive method thus produces hard, accurately dimensioned and high-quality coatings. They are formed rapidly, are dense and well-adhered, and the coatings prepared with the inventive method also better protect the roll body against corrosion.

An electrochemically prepared coating is denser than a spray coating, this density being utilized by the method of the invention in the formation of roll surface properties.

It has further been taken into account in the invention that the pores must be blocked according to suitable process parameters used in electrochemical coating, which parameters take into account e.g. that the "effective" area to be coated is smaller than that of the block not provided with a spraying layer.

TABLE 2

| DIFFERENT COATING ELECTROLYTES | |
|---|---|
| | Noble metallic electrolytes |
| Antimony | Gallium |
| Arsenium | Gold |
| Bismuth | Gold (for undercoating) |
| Cadmium (acid) | Gold (hard alloy) |
| Cadmium LHE | Gold (neutral) |
| Cadmium (alkaline) | Gold antimony (1%) |
| Chromium (neutral) | Gold (acid) |
| Chromium (acid) | Indium |
| Cobalt (machinable) | Indium B |
| Cobalt (semi-bright, heavy build) | Palladium |
| Copper (acid) | Palladium E.G. |
| Copper (high speed acid) | Platinum |
| Copper (heavy build, alkaline) | Radium |
| Copper (DILItho) | Radium (low stress) |
| Copper (neutral) | Thenium |
| Iron | Ruthenium |
| Iron (semi-bright, high leveling) | Silver |
| Lead | Silver E.G. |
| Lead (for alloying) | Silver (heavy build) |
| Lead (acid) | |
| Nickel (acid) | Composite electrolytes |
| Nickel (high temperature) | |
| Nickel (low stress) | Babbitt (heavy build) |
| Nickel (special) | Babbitt |
| Nickel (acid, heavy build) | Chromium (cap) |
| Nickel (semi-bright, high leveling) | Cobalt-Wolfram |
| Nickel (high speed) | Iron |
| Nickel XHB | Nickel (black) |
| Nickel "M" (for magnesium) | Nickel-wolfram |
| Nickel (neutral | Nickel-cobolt |
| Tin (acid) | Nickel-wolfram "D" |
| Tin (alkaline) | Tin-antimony |
| Zinc (alkaline) | Tin-indium (80/20) |
| Zinc (alkaline) | Tin-indium (80/20) |
| Zinc (acid) | Tin-lead (60/40) |
| | Tin-zinc |

BRIEF DESCRIPTION OF THE DRAWINGS

The invention is next illustrated further by means of the enclosed figures.

DESCRIPTION OF THE PREFERRED EMBODIMENTS

Figure 1:
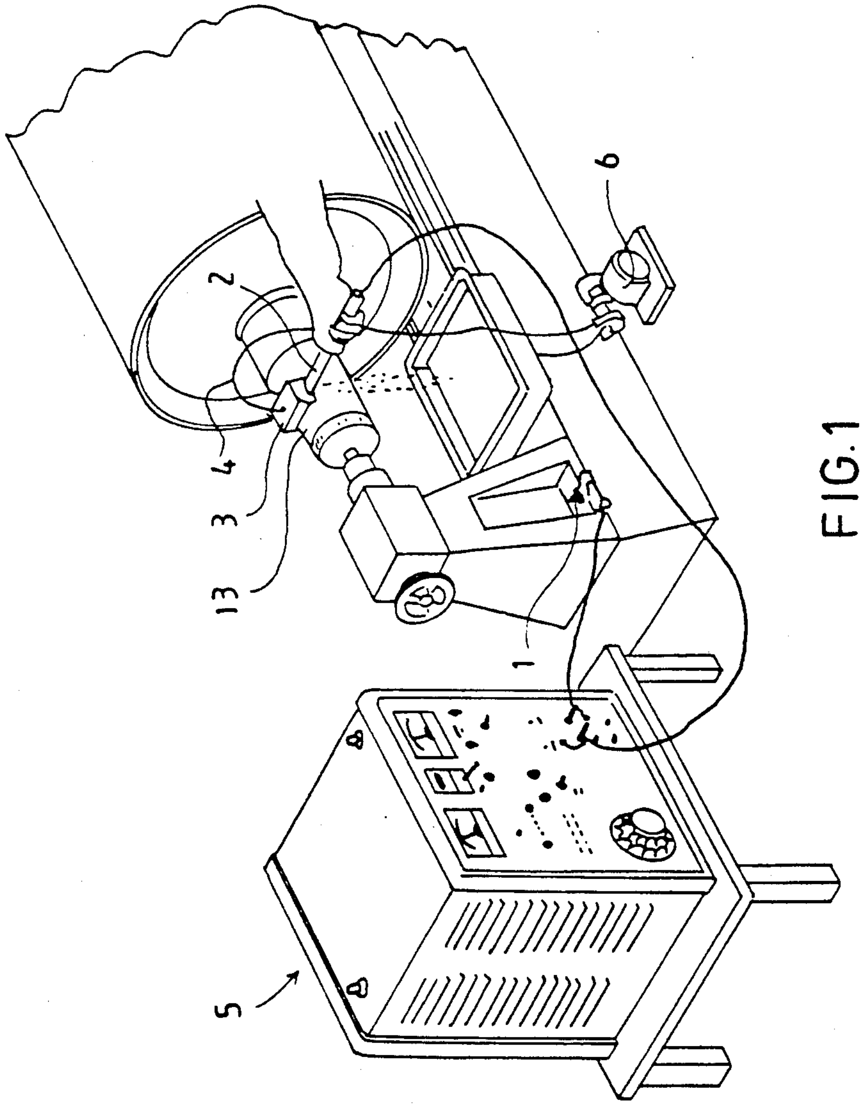
FIG. 1 is a perspective view of a spread coating operation.

FIG. 1 shows a device that can be utilized in the invention for reinforcing a porous coating. Spread coating requires a current source 1, an anode holder 2 and an anode 3 as well as various electrolytes connected to the anode e.g. via a wire 4. The work piece 7 (the roll to be coated) is connected according to FIG. 1 to the negative pole of a rectifier 5 as a cathode and the tool 3 to the positive pole as an anode. The coating electrolyte is brought to the work piece 7 either by means of a pump 6 through a carbon electrode or by dipping the tool 3 from time to time into the electrolyte. There is porous material on the graphite used as an anode material, into which porous material the electrolyte is absorbed. When the tool 3 (anode) and the work piece 7 (cathode) contact each other, an electric circuit closes and the metal incorporated into the electrolyte precipitates on the surface of the work piece 7, i.e. the roll 7 is coated. During coating, the tool 3 and the work piece 7 have to move relative to each other. In practice, this is usually arranged in such a way that when the work piece is a rotating piece, such as a rotating roll, it is rotated whereas the anode 3 remains in a fixed position. The anode-cathode moving speed is ca. 10-20 m/min.

Figure 2A:
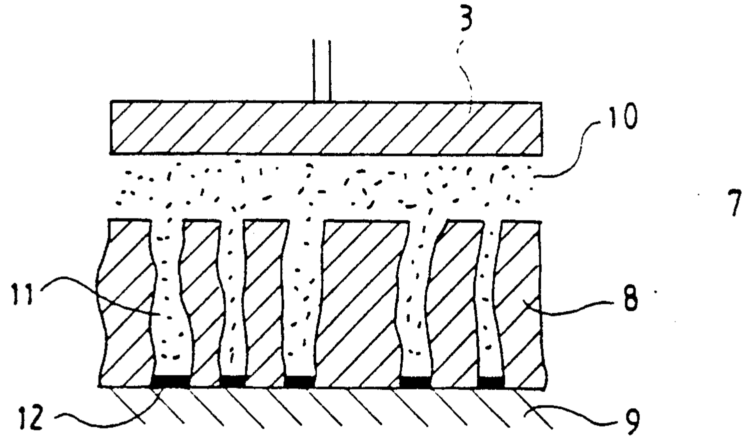
FIGS. 2A-2C are cross-sectional views of the roll coating, showing how an electrolytic surface is gradually formed on top of a porous coating.

FIG. 2A shows a cross-section of the roll 7, on which a porous coating 8 is formed. The roll body has a reference number 9. The electrolyte 10 is brought onto the porous coating by means of a movable anode 3, and the growth of the metal coating 12 starts at the bottom of the pore 11.

Figure 2B:
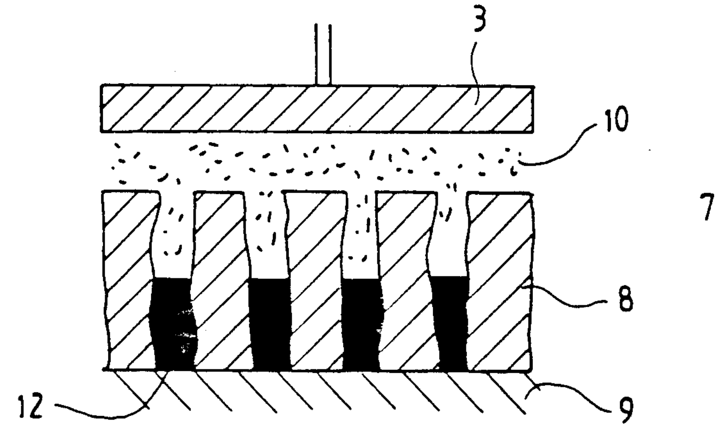

FIG. 2B shows the growth of the electrolytic coating in the pores.

Figure 2C:
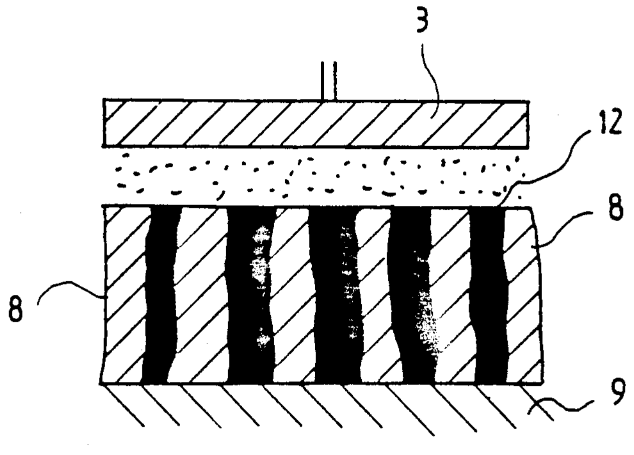

FIG. 2C shows how the electrolytic coating grows up to the surface of porous coating 8, whereby it alters the surface properties, seals the pores and reinforces the sprayed porous layer 8.

Figure 3:
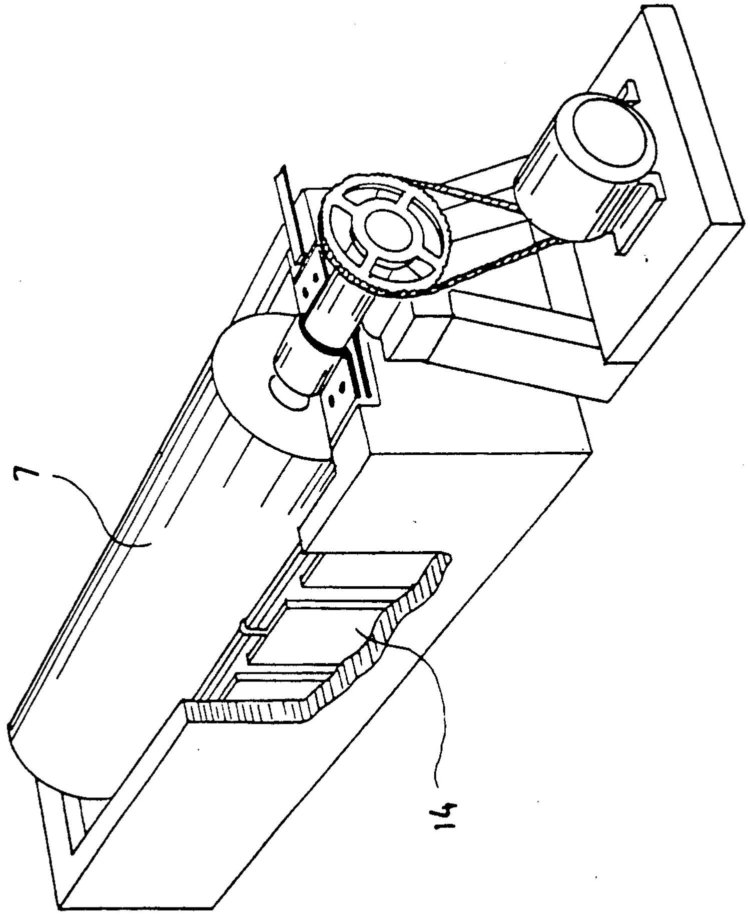
FIG. 3 shows chrome plating as performed by an electrochemical coating method.

FIG. 3 shows a device for performing chrome plating for the roll. Chrome plating occurs in a coating pan so that the piece is submerged into the electrolyte. During coating, the roll 7 is connected as a cathode and an insoluble lead plate 14 as an anode.

The invention utilizes the different advantages obtained by means of an electrochemical and spray coating by combining these in a suitable manner, which decreases the adherence of a paper web to the roll, and improves the corrosion resistance and strength properties of the coating (impact and nip-load resistance) relative to the rolls of prior art.

Obviously, numerous modifications and variations of the present invention are possible in the light of the above teachings. It is therefore to be understood that within the scope of the claims appended hereto, the invention may be practiced otherwise than as specifically disclosed herein.

What is claimed is:

1. A roll used for paper or paperboard making, such roll comprising a central core;

a porous coating having pores therethrough formed on an outside surface of said central core;

a precipitate electrochemically obtained from an electrolyte formed in said pores, said electrolyte functioning to seal said pores.

2. The roll of claim 1, wherein said porous coating is a ceramic coating.

3. The roll of claim 2, wherein said porous coating is a metallic coating.

4. The roll of claim 3, wherein said porous coating is a metallic-ceramic coating.

5. The roll of claim 1, wherein said porous coating has a porosity of 4-50% an a pore size of 5-50 microns.

* * * * *